United States Patent [19]
Ampulski

[11] Patent Number: 6,149,849
[45] Date of Patent: Nov. 21, 2000

[54] PROCESS AND APPARATUS FOR MAKING PAPERMAKING BELT

[75] Inventor: Robert Stanley Ampulski, Fairfield, Ohio

[73] Assignee: The Procter & Gamble Copmany, Cincinnati, Ohio

[21] Appl. No.: 09/134,258

[22] Filed: Aug. 14, 1998

[51] Int. Cl.$^7$ .................................................. B29C 41/28
[52] U.S. Cl. ............... 264/167; 264/171.13; 264/171.14; 264/171.21; 264/172.19; 425/363
[58] Field of Search .................................. 264/167, 40.4, 264/171.13–171.18, 171.21, 171.24, 171.25, 172.19, 173.1; 425/363, 370, 371, 373, 374

[56] References Cited

U.S. PATENT DOCUMENTS

| | | |
|---|---|---|
| 3,515,778 | 6/1970 | Fields et al. . |
| 4,078,032 | 3/1978 | Wenner ..................................... 264/167 |
| 4,097,634 | 6/1978 | Bergh ....................................... 428/156 |
| 4,111,634 | 9/1978 | Limbach et al. . |
| 4,514,345 | 4/1985 | Johnson et al. . |
| 4,528,239 | 7/1985 | Trokhan . |
| 4,529,480 | 7/1985 | Trokhan . |
| 4,543,225 | 9/1985 | Beaujean . |
| 4,637,859 | 1/1987 | Trokhan . |
| 5,098,522 | 3/1992 | Smurkoski et al. . |
| 5,260,171 | 11/1993 | Smurkoski et al. . |
| 5,275,700 | 1/1994 | Trokhan . |
| 5,328,565 | 7/1994 | Rasch et al. . |
| 5,334,289 | 8/1994 | Trokhan et al. . |
| 5,364,504 | 11/1994 | Smurkoski et al. . |
| 5,431,786 | 7/1995 | Rasch et al. . |
| 5,496,624 | 3/1996 | Stelljes, Jr. et al. . |
| 5,500,277 | 3/1996 | Trokhan et al. . |
| 5,514,523 | 5/1996 | Trokhan et al. . |
| 5,529,664 | 6/1996 | Trokhan et al. . |
| 5,554,333 | 9/1996 | Fujiki ....................................... 264/284 |
| 5,554,467 | 9/1996 | Trokhan et al. . |
| 5,566,724 | 10/1996 | Trokhan et al. . |
| 5,589,122 | 12/1996 | Leonard et al. ......................... 264/146 |
| 5,624,790 | 4/1997 | Trokhan et al. . |
| 5,628,876 | 5/1997 | Ayers et al. . |
| 5,669,120 | 9/1997 | Wessels et al. ............................ 24/446 |
| 5,679,222 | 10/1997 | Rasch et al. . |
| 5,714,041 | 2/1998 | Ayers et al. . |
| 5,851,467 | 12/1998 | Murasaki ................................. 264/167 |
| 5,972,813 | 10/1999 | Polat et al. .............................. 442/320 |

FOREIGN PATENT DOCUMENTS

| | | |
|---|---|---|
| WO 86/05220 | 9/1986 | WIPO . |
| WO 99/35332 | 7/1999 | WIPO . |

*Primary Examiner*—Jan H. Silbaugh
*Assistant Examiner*—Mark Eashoo
*Attorney, Agent, or Firm*—Vladimir Vitenberg; Larry L. Huston; Tara M. Rosnell

[57] ABSTRACT

A process and an apparatus for making a papermaking belt are provided, the belt comprising a reinforcing structure and a resinous framework joined together. The preferred continuous process comprises the steps of depositing a flowable resinous material onto a patterned molding surface; continuously moving the molding surface and the reinforcing structure at a transport velocity such that at least a portion of the reinforcing structure is in a face-to-face relationship with a portion of the molding surface; transferring the flowable resinous material from the molding surface onto the reinforcing structure; causing the flowable resinous material and the reinforcing structure to join together; and solidifying the resinous material thereby forming the resinous framework joined to the reinforcing structure. The apparatus comprises a molding member having a patterned molding surface comprising a plurality of molding pockets to carry a flowable resinous material therein; a means for depositing the flowable resinous material into the molding pockets of the molding surface; a means for moving the reinforcing structure in a predetermined direction; a means for moving the molding member in a predetermined direction such that the flowable resinous material is transferred from the molding pockets onto the reinforcing structure.

25 Claims, 10 Drawing Sheets

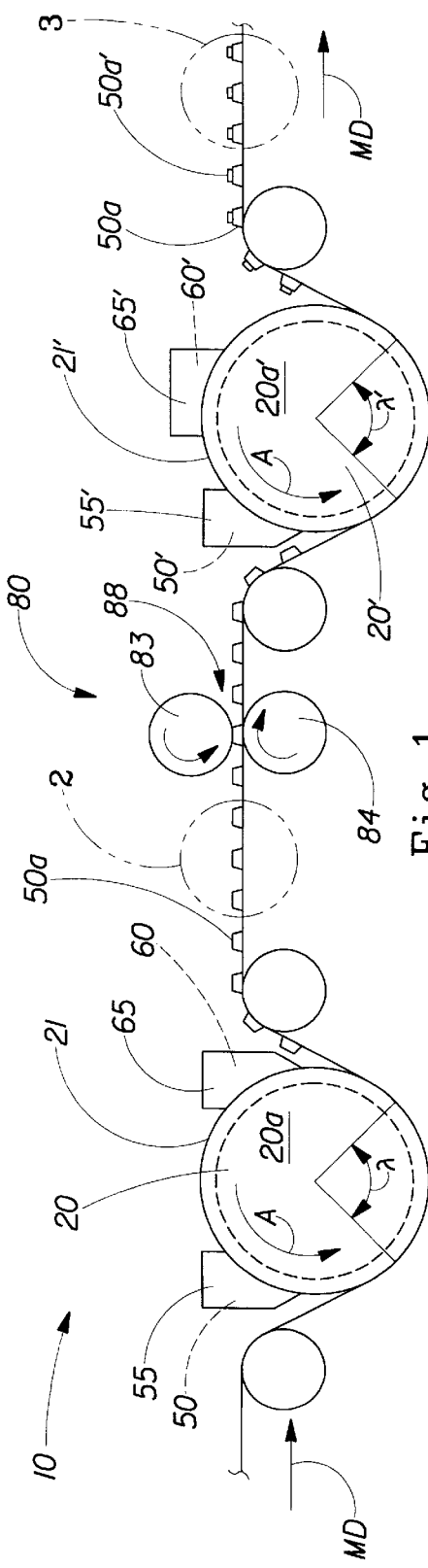
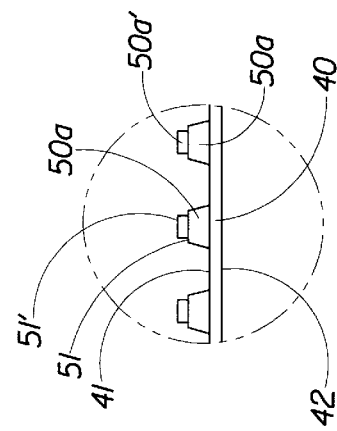
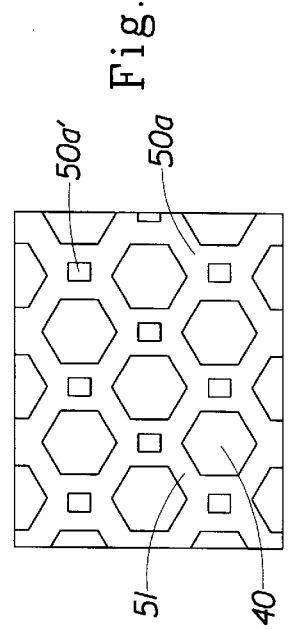
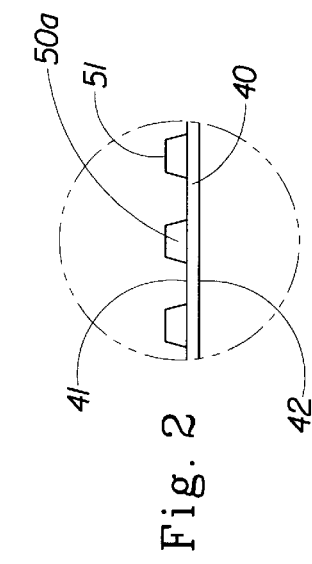
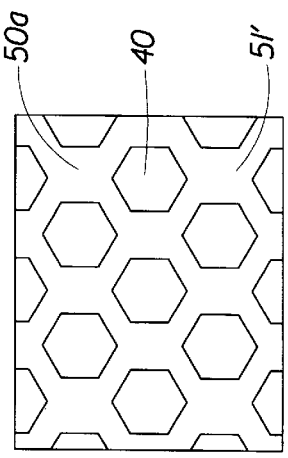

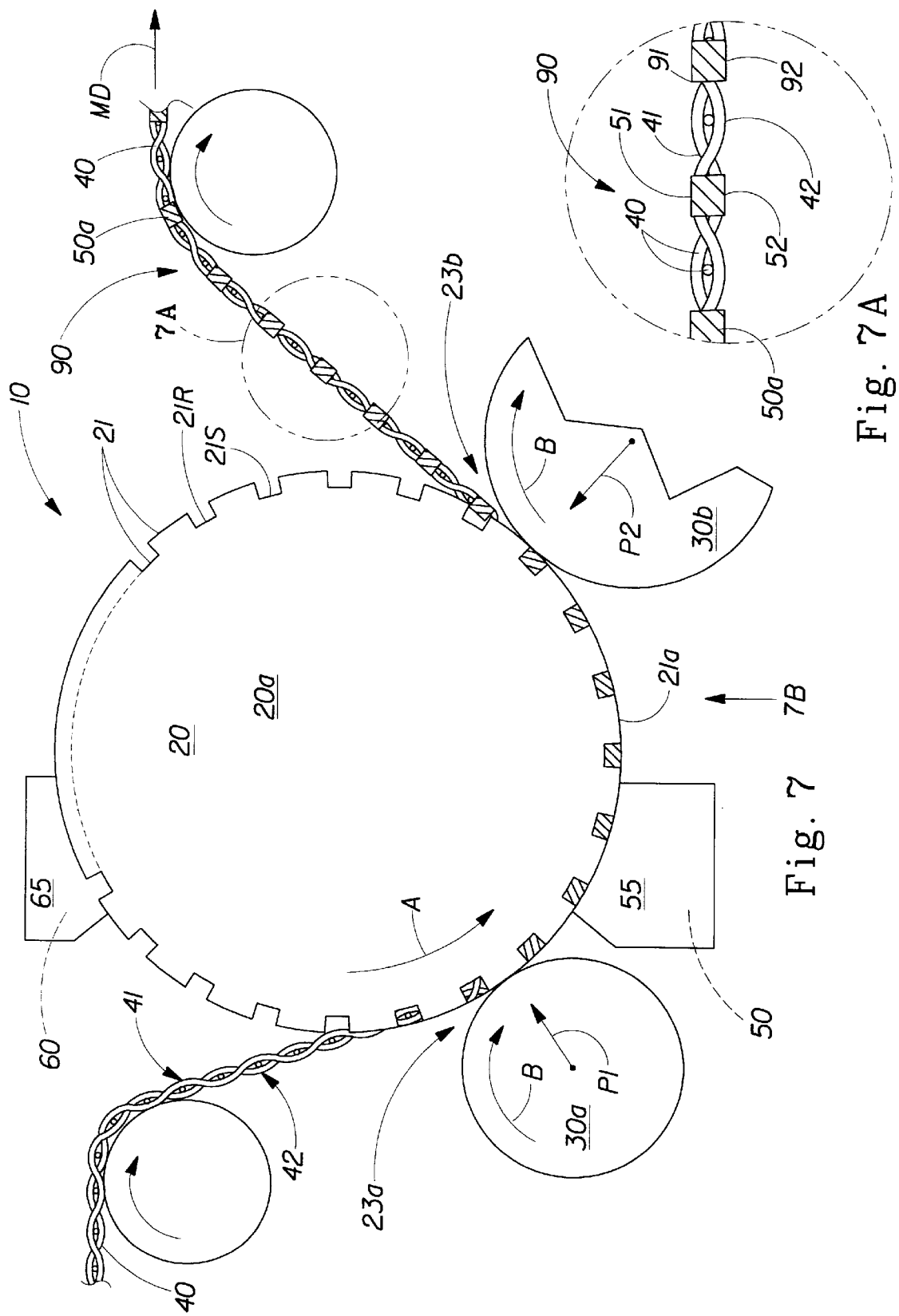

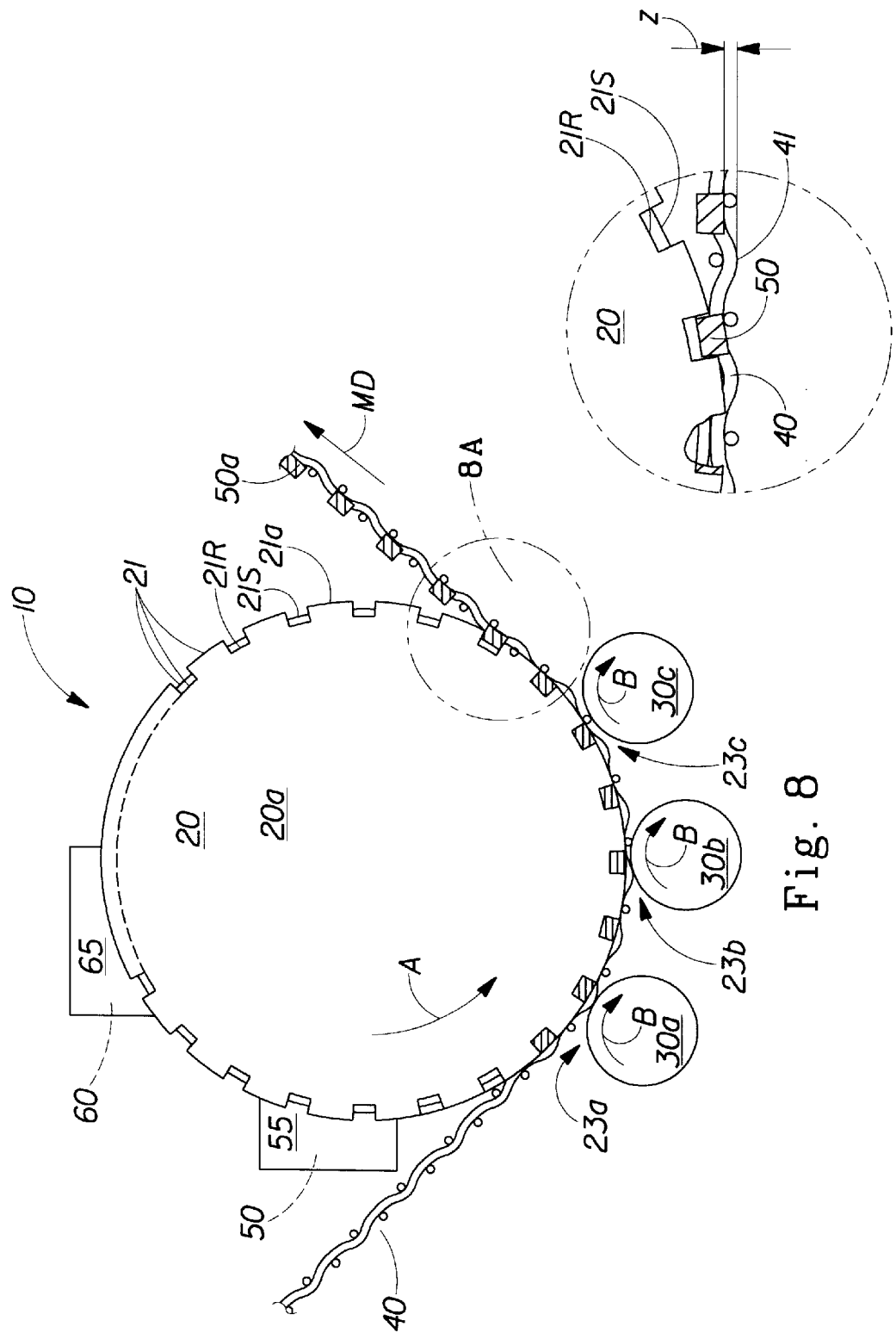

PROCESS AND APPARATUS FOR MAKING PAPERMAKING BELT

FIELD OF THE INVENTION

The present invention generally relates to papermaking belts useful in papermaking machines for making strong, soft, absorbent paper products. The invention is also concerned with a method of making such papermaking belts. More particularly, the invention relates to papermaking belts comprising a resinous framework and a reinforcing structure joined thereto.

BACKGROUND OF THE INVENTION

Generally, a papermaking process includes several steps. Typically, an aqueous slurry of papermaking fibers is formed into an embryonic web on a foraminous member, such, for example, as a Fourdrinier wire. After the initial forming of the paper web on the Fourdrinier wire, or forming wires, the paper web is carried through a drying process or processes on another piece of papermaking clothing in the form of endless belt which is often different from the Fourdrinier wire or forming wires. This other clothing is commonly referred to as a drying fabric or belt. While the web is on the drying belt, the drying or dewatering process can involve vacuum dewatering, drying by blowing heated air through the web, a mechanical processing, or a combination thereof.

In through-air-drying processes developed and commercialized by the present assignee, the drying fabric may comprise a so-called deflection member having a microscopically monoplanar, continuous, and preferably patterned and nonrandom network surface which defines a plurality of discrete, isolated from one another deflection conduits. Alternatively, the deflection member may comprise a plurality of discrete protuberances isolated from one another by a substantially continuous deflection conduit, or be semi-continuous (i. e., comprising a combination of the continuous and discrete network). The embryonic web is associated with the deflection member. During the papermaking process, the papermaking fibers in the web are deflected into the deflection conduits and water is removed from the web through the deflection conduits. The web then is dried and foreshortened, if desired, by creping. Deflection of the fibers into the deflection conduits of the papermaking belt can be induced by, for example, the application of differential fluid pressure to the embryonic paper web. One preferred method of applying differential pressure is exposing the web to a fluid pressure differential through the drying fabric comprising the deflection member.

Through-air-dried paper webs may be made according to any commonly assigned and incorporated herein by reference U.S. Pat. No. 4,529,480 issued to Trokhan on Jul. 16, 1985; U.S. Pat. No. 4,637,859 issued to Trokhan on Jan. 20, 1987; U.S. Pat. No. 5,364,504, issued to Smurkoski et al. on Nov. 15, 1994; U.S. Pat. No. 5,259,664, issued to Trokhan et al. on Jun. 25, 1996; and U.S. Pat. No. 5,679,222, issued to Rasch et al. on Oct. 21, 1997.

Generally, a method of making the deflection member comprises applying a coating of liquid photosensitive resin to a surface of a foraminous element, controlling the thickness of the coating to a pre-selected value, exposing the coating of the liquid photosensitive resin to light in an activating wave-length through a mask, thereby preventing or reducing curing of selected portions of the photosensitive resin. Then the uncured portions of the photosensitive resin are typically washed away by showers. Several commonly assigned U.S. patents which are incorporated herein by reference, disclose methods of making papermaking belts: U.S. Pat. No. 4,514,345, issued Apr. 30, 1985 to Johnson et al.; U.S. Pat. No. 4,528,239, issued Jul. 9, 1985 to Trokhan; U.S. Pat. No. 5,098,522, issued Mar. 24, 1992; U.S. Pat. No. 5,260,171, issued Nov. 9, 1993 to Smurkoski et al.; U.S. Pat. No. 5,275,700, issued Jan. 4, 1994 to Trokhan; U.S. Pat. No. 5,328,565, issued Jul. 12, 1994 to Rasch et al.; U.S. Pat. No. 5,334,289, issued Aug. 2, 1994 to Trokhan et al.; U.S. Pat. No. 5,431,786, issued Jul. 11, 1995 to Rasch et al.; U.S. Pat. No. 5,496,624, issued Mar. 5, 1996 to Stelljes, Jr. et al.; U.S. Pat. No. 5,500,277, issued Mar. 19, 1996 to Trokhan et al.; U.S. Pat. No. 5,514,523, issued May 7, 1996 to Trokhan et al.; U.S. Pat. No. 5,554,467, issued Sep. 10, 1996, to Trokhan et al.; U.S. Pat. No. 5,566,724, issued Oct. 22, 1996 to Trokhan et al.; U.S. Pat. No. 5,624,790, issued Apr. 29, 1997 to Trokhan et al.; U.S. Pat. No. 5,628,876 issued May 13, 1997 to Ayers et al.; U.S. Pat. No. 5,679,222 issued Oct. 21, 1997 to Rasch et al.; and U.S. Pat. No. 5,714,041 issued Feb. 3, 1998 to Ayers et al., the disclosures of which are incorporated herein by reference.

While curing of the photosensitive resin has proved to be an effective way of making the papermaking belt, a search for improved methods and products has continued. Now, it is believed that the deflection member may be made by at least several other methods which do not necessarily require the use of the curing radiation.

Accordingly, it is an object of the present invention to provide a novel process for making a papermaking belt by first, forming a desired pattern of a fluid resin in a molding member, and then transferring the resin from the molding member to the reinforcing structure and solidifying the patterned resin. Another object of the present invention is to provide a process that reduces the amount of the resin required to construct the papermaking belt comprising a reinforcing structure and a patterned resinous framework. Still another object of the present invention is to provide an apparatus comprising a molding member for forming a desirable pattern of the resin and subsequently transferring the patterned resin to the reinforcing structure of the belt being constructed.

These and other objects of the present invention will be more readily apparent when considered in reference to the following description, in conjunction with the accompanying drawings.

SUMMARY OF THE INVENTION

A papermaking belt that can be made by a process and an apparatus of the present invention comprises a reinforcing structure and a patterned resinous framework joined thereto. The reinforcing structure has a first side and an opposite second side. Preferably, but not necessarily, the reinforcing structure comprises a fluid-permeable element, such as, for example, a woven fabric or a screen having a plurality of open areas therethrough. The reinforcing structure may also comprise a felt. The resinous framework has a top side and a bottom side, the top and bottom sides corresponding to the first and second sides of the reinforcing structure, respectively. The resinous framework may have a substantially continuous pattern, a discrete pattern, or a combination thereof (i.e., a "semi-continuous pattern").

A process for making the belt comprises the following steps: providing a reinforcing structure having a first side, a second side opposite to the first side, and a thickness formed therebetween; providing a flowable resinous material; providing at least one molding member having a molding surface comprising a pre-selected pattern of molding pockets structured and designed to carry the flowable resinous material therein; continuously moving the molding surface at a transport velocity; depositing the flowable resinous material into the molding pockets of the molding surface; continuously transporting the reinforcing structure at the transport velocity such that at least a portion of the reinforcing structure is in a face-to-face relationship with at least a portion of the molding surface; transferring the flowable resinous material from the molding pockets of the molding surface onto the reinforcing structure; causing the flowable resinous material and the reinforcing structure to join together; and solidifying the resinous material thereby forming the resinous framework joined to the reinforcing structure. Preferably, the resinous material is transferred from the molding pockets onto the reinforcing structure in the predetermined pattern corresponding to the pattern of the molding pockets. Preferably, a step is provided of treating the molding surface with a release agent prior to depositing the resinous material onto/into the molding surface. When the reinforcing structure is in a face-to-face relationship with the molding surface, preferably the reinforcing structure contacts the flowable resinous material disposed in the molding pockets for a predetermined period of time sufficient to cause the flowable resinous material and the reinforcing surface to at least partially join together. The transferal of the resinous material from the molding surface onto the reinforcing structure may be assisted by pressing the molding surface and the reinforcing structure relative each other.

An apparatus for making the papermaking belt has a machine direction and comprises a molding member having a patterned molding surface comprising a plurality of molding pockets. The molding pockets are structured and designed to carry a flowable resinous material therein. In one embodiment, the molding member comprises a rotatable molding roll having a circumference and a longitudinal axis of rotation perpendicular to the machine direction. The circumference of the molding roll comprises the molding surface. In another embodiment, the molding member comprises an endless molding band adapted to continuously travel in the machine direction.

The apparatus further comprises a means for depositing the flowable resinous material into the molding pockets of the molding surface, a means for moving the reinforcing structure in the machine direction such that at least a portion of the reinforcing structure is in a face-to-face relationship with at least a portion of the molding surface, and a means for moving the molding member in the machine direction such that the flowable resinous material is transferred from the molding pockets onto the reinforcing structure, preferably in a pre-selected pattern. The apparatus preferably further comprises a means for solidifying the flowable resinous material such as to form the resinous framework joined to the reinforcing structure. In one embodiment, the molding pockets of the molding surface form a substantially continuous pattern, in which instance the resinous material is transferred onto the reinforcing structure in a substantially continuous pattern. In another embodiment, the molding pockets of the molding roll form a pattern of discrete molding pockets, in which instance the resinous material is transferred onto the reinforcing structure in a pattern comprising discrete resinous protuberances. An embodiment is contemplated in which the molding pockets of the molding surface form a combination of the substantially continuous pattern and the discrete pattern, a so-called "semi-continuous" pattern.

The resinous material may, in some embodiments, extend outwardly from the first side of the reinforcing structure after the resinous material has been deposited onto the reinforcing structure. The molding pockets have a depth therein, which may differentiate throughout different parts of the molding surface. The present invention allows one to make the belt in which the resinous framework has differential thickness throughout the belt's plane. At the same time, the present invention allows one to construct the belt in which the top side of the resinous framework and the first side of the reinforcing structure lie in substantially the same plane.

The flowable resinous material is preferably selected from the group consisting of epoxies, silicones, urethanes, polystyrenes, polyolefins, polysulfides, nylons, butadienes, photopolymers, and any combination thereof. In one preferred embodiment the fluid resinous material comprises a photosensitive resin. The fluid resinous material may comprise a thermo-sensitive resin, such as thermo-sefting or thermoplastic material. Preferably, the fluid resinous material is provided in a liquid state. The fluid resinous material may be deposited onto/into the molding surface by first, contacting the molding surface with the flowable resinous material and second, removing excess of the flowable resinous material from the molding surface as the molding surface is moving.

The apparatus further may comprise a means for pressing the reinforcing structure and the molding surface relative to each other for a predetermined period of time, thereby facilitating the transferal of the resinous material from the molding surface to the reinforcing structure. In one embodiment, the apparatus comprises a backing roll juxtaposed with the molding surface to form a nip therebetween. In another embodiment, the apparatus comprises a backing sheet juxtaposed with the molding surface. The backing sheet is structured and designed to move in a face-to-face contacting relationship with at least a portion of the reinforcing structure. Preferably, the backing sheet is tensioned.

In one embodiment, the molding surface comprises a predetermined pattern of recesses. The recesses are structured and designed to receive the reinforcing structure therein. This embodiment provides the belt in which a substantial portion of the bottom side of the resinous framework is elevated above the second side of the reinforcing structure. That is, the belt has a distance formed between the second side of the reinforcing structure and the substantial portion of the bottom side of the resinous framework. During a papermaking process, this distance provides leakage between the belt and a dewatering papermaking equipment, thereby eliminating a sudden application of fluid pressure differential to a paper web disposed on the belt and mitigating a phenomenon known as "pinholling." The distance between the second side of the reinforcing structure and the bottom side of the resinous framework may differentiate throughout the plane of the belt.

The apparatus may further comprise a means for solidifying the flowable resinous material, such as, for example a curing device comprising a source of UV radiation, for curing the resinous material comprising a photosensitive resin. Optionally, a step and a means may be provided of controlling a thickness of the resinous material joined to the reinforcing structure to at least one pre-selected value.

BRIEF DESCRIPTION OF THE DRAWINGS

FIG. 1 is a schematic side elevational view of one embodiment of a process and an apparatus of the present invention, the process shown comprising a multi-step process shown in FIG. 1.

FIG. 2 is a schematic side elevational and more detailed view of a fragment 2 of FIG. 1, showing a papermaking belt being constructed at a first step of the multi-step process shown in FIG. 1.

FIG. 2A is a simplified top plan view, taken along lines 2A—2A of FIG. 2.

FIG. 3 is a schematic side elevational and more detailed view of a fragment 3 of FIG. 1, showing a papermaking belt being constructed at a second step of the multi-step process shown in FIG. 1.

FIG. 3A is a simplified top plan view, taken along lines 3A—3A of FIG. 3.

FIG. 7 is a schematic side elevational view of another embodiment of the process and the apparatus of the present invention, showing a reinforcing structure wrapping around a portion of the circumference of the molding roll and entirely recessed therewithin.

FIG. 7A is a schematic and more detailed view of a fragment 7A of FIG. 7, showing the papermaking belt being constructed using the process and the apparatus shown in FIG. 7.

FIG. 8 is a schematic and partial side elevational view of another embodiment of the process and the apparatus of the present invention, showing the reinforcing structure wrapping around a portion of the circumference of the molding roll and partially recessed therewithin, the apparatus comprising three backing rolls juxtaposed with the molding roll and contacting the reinforcing structure.

FIG. 8A is a schematic and more detailed side elevational view of a fragment 8A of FIG. 8.

DETAILED DESCRIPTION OF THE INVENTION

A representative papermaking belt 90 which can be made in accordance with the present invention is schematically shown in FIGS. 9, 9A, 11, and 11A. As used herein, the term "papermaking belt," or simply "belt," refers to a substantially microscopically-monoplanar structure designed to support, and preferably carry, a web thereon during at least one stage of a papermaking process. Typically, modern industrial-scale processes utilize the endless papermaking belts, but it is to be understood that the present invention may be used for making discrete portions of the belt 90 or stationary plates which may be used for making web handsheets, rotating drums, etc.

Figure 9:
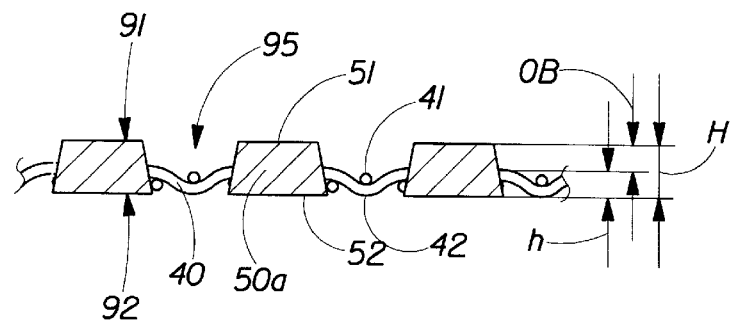
FIG. 9 is a schematic partial cross-sectional view, taken along lines 9—9 of FIG. 9A, of one exemplary embodiment of the papermaking belt which may be made using the process and the apparatus of the present invention, the belt comprising a substantially continuous framework joined to the reinforcing structure, and a plurality of discrete deflection conduits.
Figure 11:
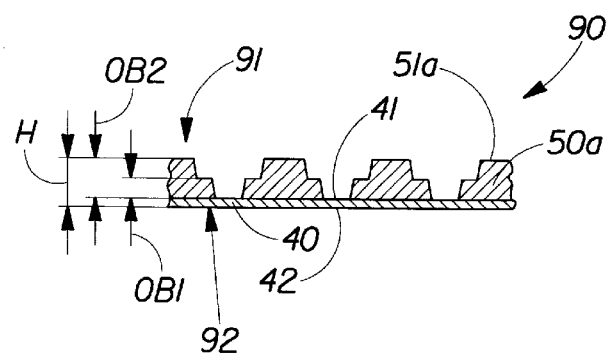
FIG. 11 is a schematic partial cross-sectional view, taken along lines 11—11 of FIG. 11A, of an exemplary embodiment of the papermaking belt which may be made using the molding roll shown in FIG. 10, the belt comprising a plurality of discrete protuberances having differential overburdens.

As FIGS. 9 and 11 show, the belt 90 has a web-contacting side 91 and a backside 92 opposite to the web-contacting side 91. The papermaking belt 90 is said to be macroscopically-monoplanar because when a portion of the belt 90 is placed into a planar configuration, the web-side 91, viewed as a whole, is essentially in one plane. It is said to be "essentially" monoplanar to recognize the fact that deviations from absolute planarity are tolerable, while not preferred, so long as the deviations are not substantial enough to adversely affect the performance of the belt 90 for the purposes of a particular papermaking process.

The papermaking belt 90 which can be made in accordance with the present invention generally comprises two primarily elements: a framework 50a (preferably, a hardened polymeric resinous framework made of a flowable polymeric resinous material 50) and a reinforcing structure 40. The reinforcing structure 40 has a first side 41 and a second side 42 opposite to the first side 41. The first side 41 may contact papermaking fibers during the papermaking process, while the second side 42 typically contacts the papermaking equipment, such as, for example, a vacuum pickup shoe and a multi-slot vacuum box (both not shown).

Figure 9A:
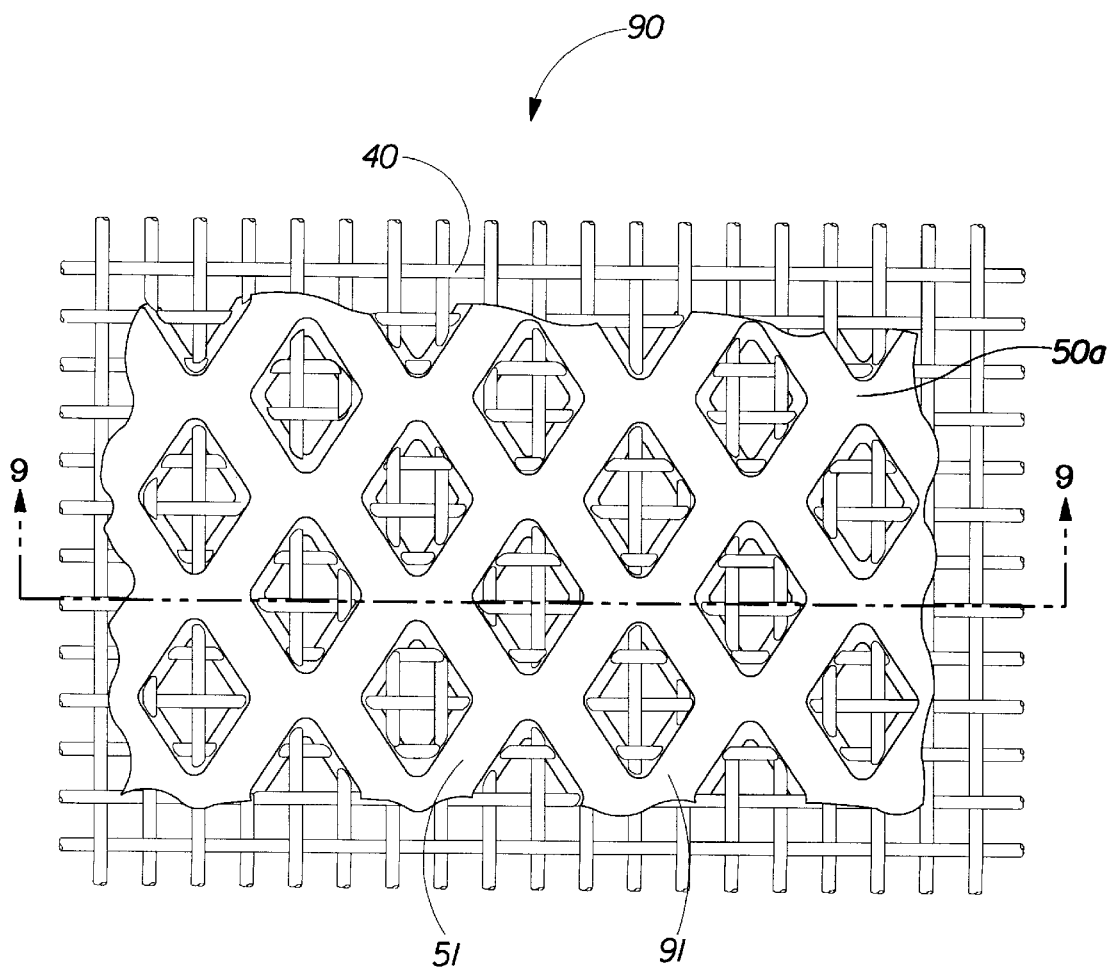
FIG. 9A is a schematic top plan view taken along lines 9A—9A of FIG. 9.

The reinforcing structure 40 can take any number of different forms. It can comprise a woven element, a nonwoven element, a screen, a net, a band, a plate, etc. In one preferred embodiment, the reinforcing structure 40 comprises a woven element formed by a plurality of machine-directional yarns interwoven with a plurality of cross-machine-directional yarns, as shown in FIGS. 9 and 9A. More particularly, the woven reinforcing structure 40 may comprise a foraminous woven element, such as disclosed in commonly-assigned U.S. Pat. No. 5,334,289, issued in the name of Trokhan et al., on Aug. 2, 1994, and incorporated by reference herein. The reinforcing structure 40 comprising a woven element may be formed by one or several layers of interwoven yarns, the layers being substantially parallel to each other and interconnected in a contacting face-to-face relationship. Commonly-assigned U.S. Pat. No. 5,679,222, issued to Rasch et al. on Oct. 21, 1997 is incorporated by reference herein. Commonly assigned U.S. Pat. No. 5,496,624, issued on Mar. 5, 1996 in the names of Stelljes, Jr. et al. is incorporated herein by reference to show a suitable reinforcing structure 40. The papermaking belt 90 may also be made using the reinforcing structure 40 comprising a felt, for example, as set forth in a commonly assigned patent application Ser. No. 08/391,372, filed Feb. 15, 1995, in the name of Trokhan et al. and entitled "Method of Applying a Curable Resin to Substrate for Use in Papermaking," which Application is incorporated herein by reference.

Figure 11A:
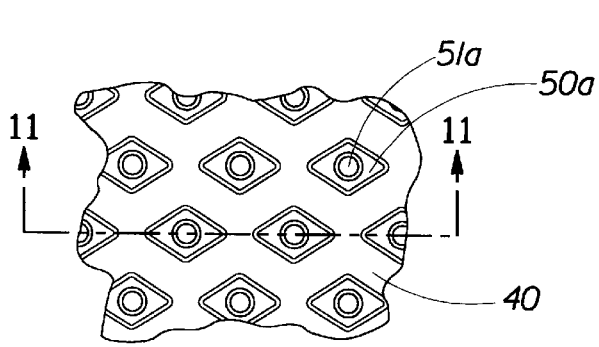
FIG. 11A is a schematic top plan view taken along lines 11A—11A of FIG. 11.

The reinforcing structure 40 of the belt 90 strengthens the resinous framework 50a and preferably has a suitable projected area into which the papermaking fibers can deflect under pressure. According to the present invention, the reinforcing structure 40 may be fluid-permeable as well as non-fluid-permeable. As used herein, the term "fluid-permeable" refers to a condition of the reinforcing structure 40, which condition allows fluids, such as water and air, to pass through the reinforcing structure 40 in at least one direction. As one skilled in the art will readily recognize, the belts comprising a fluid-permeable reinforcing structures are typically used in through-air-dry processes of making a paper web. An example of the non-fluid permeable reinforcing structure 40 is shown in FIGS. 11 and 11A.

As shown in FIGS. 9, 9a, 11, 11a, the reinforcing structure 40 is joined to the resinous framework 50a. The resinous framework 50a comprises a solidified resinous material 50, i. e., the resinous framework 50 is a solid phase of the fluid resinous material 50a. In that sense, the terms "resinous material 50" and the resinous framework 50a" may be used interchangeably where appropriate in the context of the description. The resinous framework 50a has a top side 51 and a bottom side 52 opposite to the top side 51. During the papermaking process, the top side 51 of the framework 50a contacts the papermaking fibers, and thus defines the pattern of the paper web being produced. The bottom side 52 of the framework 50a may, in some embodiments (FIGS. 7 and 7A), contact the papermaking equipment, in which embodiments the bottom side 52 of the framework and the second side 42 of the reinforcing structure may be disposed in the same macro-plane. Alternatively, a distance Z may be formed between the bottom side 52 of the framework 50a and the second side 42 of the reinforcing structure (FIG. 8A).

Another embodiment (not shown) of the framework 50a may comprise the bottom side 52 having a network of passageways that provide backside surface texture irregularities, as described in commonly-assigned U.S. Pat. No. 5,275,700 issued on Jan. 4, 1994 to Trokhan, which patent is incorporated by reference herein. The two latter embodiments of the framework 50a—one having the distance Z between the bottom side 52 of the framework 50a, and the other having the backside texture irregularities—beneficially provide leakage between mutually-contacting the bottom side 52 of the framework 50 and a surface of the papermaking equipment. The leakage reduces, or even eliminates altogether, a sudden application of the vacuum pressure to the paper web, thereby mitigating a phenomenon known as pinholing.

A first step of the process according to the present invention comprises providing a reinforcing structure 40. As has been explain above, the reinforcing structure 40 is a substrate that may comprise a variety of different forms, such as, for example, a woven fabric, a felt, a screen, a band, etc. A more detailed description of the reinforcing structure 40, particularly one comprising a woven element, is found in commonly-assigned U.S. Pat. No. 5,275,700 incorporated herein by reference. Regardless of its specific embodiment, the reinforcing structure 40 has a first side 41 and a second side 42, as best shown in FIGS. 4, 7, 7A, and 11. In the formed papermaking belt 90, the first side 41 faces (and in some embodiment may contact) the papermaking fibers during the papermaking process, while the second side 42, opposite to the first side 41, faces (and typically contacts) the papermaking equipment. As used herein, the first side 41 and the second side 42 of the reinforcing structure 40 are consistently referred to by these respective names regardless of incorporation (i. e., prior, during, and after the incorporation) of the reinforcing structure 40 into the papermaking belt 90. A distance between the first side 41 and the second side 42 of the reinforcing structure forms a thickness of the reinforcing structure, designated herein as "h" (FIG. 9). In the preferred continuous process of the present invention, the reinforcing structure 40 continuously moves in a machine direction, indicated in several figures as "MD." The use of the term "machine direction" herein is consistent with the traditional use of the term in papermaking, where this term refers to a direction which is parallel to the flow of the paper web through the papermaking equipment. As used herein, the "machine direction" is a direction parallel to the flow of the reinforcing structure 40 during the process of the present invention.

The next step of the process of the present invention comprises providing a flowable resinous material 50. As used herein, the term "flowable resinous material" refers to a wide variety of polymeric resins and plastics that can achieve and maintain under certain conditions and/or for a certain period of time, a fluid, or liquid, state sufficiently to be molded into a structure having a desired configuration, and then solidify, and preferably cure, to form the framework 50a, as has been explained above. The flowable resinous material 50 of the present invention may comprise a material selected from the group consisting of: epoxies, silicones, urethanes, polystyrenes, polyolefines, polysulfides, nylons, butadienes, photopolymers, and any combination thereof.

The examples of the suitable liquid resinous material 50 comprising silicones, include, but are not limited to: "Smooth-Sil 900," "Smooth-Sil 905," "Smooth-Sil 910," and "Smooth-Sil 950." The examples of the suitable liquid resinous material 50 comprising polyurethanes, include, but are not limited to: "CP-103 Supersoft," "Formula 54-290 Soft," "PMC-121/20," "PL-25," "PMC-121/30," "BRUSH-ON 35," "PMC-121/40," "PL-40," "PMC-724," "PMC-744," "PMC-121/50," "BRUSH-ON 50," "64-2 Clear Flex," "PMC-726," "PMC-746," "A60," "PMC-770," "PMC-780," "PMC-790." All the above exemplary materials are commercially available from Smooth-On, Inc., 2000 St. John Street, Easton, Pa., 18042. Other examples of the liquid resinous material 50 include multi-component materials, such as, for example, a two-component liquid plastic "Smooth-Cast 300," and a liquid rubber compound "Clear Flex 50," both commercially available from Smooth-On, Inc.

Photosensitive resins may also be used as the resinous material 50. The photosensitive resins are usually polymers that cure, or cross-link, under the influence of radiation, typically ultraviolet (UV) light. References containing more information on liquid photosensitive resins include Green et al., "Photocross-Linkage Resin Systems," J. Macro-Sci. Revs Macro Chem. C21 (2), 187–273 (1981–82); Bayer, "A Review of Ultraviolet Curing Technology", Tappi Paper Synthetics Conf. Proc., Sep. 25–27, 1978, pp. 167–172; and Schmidle, "Ultraviolet Curable Flexible Coatings", J. of Coated Fabrics, 8, 10–20 (July, 1978). All the preceding three references are incorporated herein by reference. Especially preferred liquid photosensitive resins are included in the Merigraph series of resins made by Hercules Incorporated, Wilmington, Del. A most preferred resin is Merigraph resin EPD 1616.

The examples of thermo-sensitive resins that can comprise the resinous material 50 of the present invention include, but are not limited to: a group of thermoplastic elastomers Hytrel® (such as Hytrel® 4056, Hytrel®7246, and Hytrel®8238); and Nylon Zytel® (such as Zytel®101L, and Zytel®132F), commercially available from DuPont Corporation of Wilmington, Del.

Preferably, the flowable resinous material 50 is provided in a liquid form. The present invention, however, contemplates the use of the flowable resinous material 50 which is provided in a solid form. In the latter instance, an additional step of fluidizing the resinous material 50 is required. The flowable resinous material 50 is preferably supplied to a source 55 which provides for the proper conditions (such as, for example, temperature) to keep the resinous material 50 in a fluid state. As used herein, the term "fluid" refers to a condition, state, or phase, of the resinous material 50, in which condition the resinous material 50 is capable of flowing and which allows the resinous material 50 be deposited onto a three-dimensionally-patterned surface such that the resinous material 50 substantially conforms to a three-dimensional pattern of the patterned surface. If thermoplastic or thermosetting resins are used as the resinous material 50, typically, a temperature slightly above the melting point of the material is desired to maintain the resin in a fluid state. The material is considered to be at or above the "melting point" if the material is wholly in the fluid state. A suitable source 55 is a trough schematically shown in several drawings of the present application. The trough may have a closed end bottom and closed side walls and outboard side wall. The inboard side wall of the trough may be open allowing the flowable resinous material 50 disposed therein to freely contact and communicate with a molding member 20, as described herein below. If the resinous material comprises a thermoplastic resin, the source 55 and the molding surface 21 are preferably heated to prevent premature solidification of the liquid resinous material 50.

The next step of the process comprises providing a molding member 20. As used herein, the "molding member" 20 is a structure designed to receive the fluid resinous material 50 and then transfer the resinous material 50 onto the reinforcing structure in a predetermined pattern. In the preferred continuous process, the molding member 20 may comprise a variety of different embodiments. In embodiments shown in FIGS. 1, 4–8, and 10, the molding member 20 comprises a molding roll 20a, while in an embodiment shown in FIG. 12, the molding member 20 comprises a molding band 20b. Regardless of its embodiment, the molding member 20 has a molding surface 21 having a three-dimensional pattern thereon, and structured and designed to receive the flowable resinous material 50 such that the flowable resinous material 50 substantially conforms to the three-dimensional pattern. Preferably the molding surface 21 comprises a pre-selected pattern of molding pockets 22 therein, as best shown in FIGS. 4, 7, 7B, 8, and 10. As used herein, the "molding surface" 21 is a generic term referring to all exposed surfaces of the molding member 20, including an inherent surface, such as an external (the most elevated) surface of the band 20b (FIG. 12), or an external (corresponding to a greater diameter) circumference 21a (FIGS. 4, 8, 10) of the roll 20a, as well as inner surfaces of the pockets 22 (FIGS. 4, 7, 8, 10). The molding surface 21 is a surface onto which the fluid resinous material 50 is deposited. In a preferred continuous process of the present invention, the molding member 20 continuously moves at a transport velocity thereby carrying the resinous material 50. One skilled in the art will readily appreciate that in the embodiments (FIGS. 1–8, and 10) comprising the rotatable molding roll or rolls 20a (20a'), the transport velocity comprises a surface velocity measured at one of the circumferences of the molding surface 21. In FIGS. 1, 4–7, and 8, a direction of rotation of the molding roll(s) 20a (20a') is indicated by an arrow "A." In the embodiment (FIG. 12) comprising the molding band 20b, the transport velocity is a velocity of the band 20b measured between supporting rolls 25 and 26.

Figure 7B:
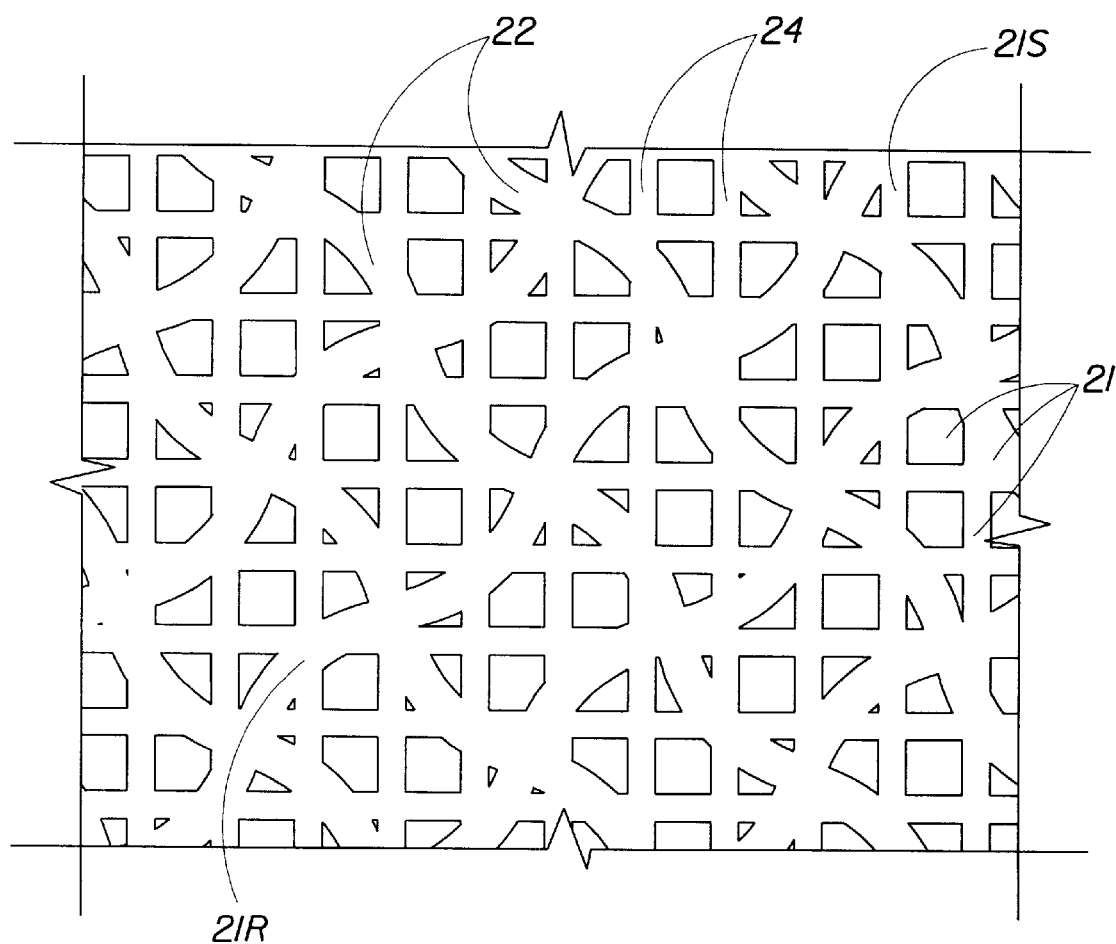
FIG. 7B is a fragmental and schematic planar representation of a view taken in the direction of the arrow 7B of FIG. 7, showing one exemplary embodiment of the circumference of the molding roll, comprising a pattern of molding pockets for receiving a flowable resin, and a pattern of recesses for receiving the reinforcing structure, two patterns being mutually interposed and having equal depths.

As used herein, the "molding pockets" 22 refers to a pattern of depressions, or cavities, of the molding surface 21, which are designed to transfer the fluid resinous material 50 from the source 55 to the reinforcing structure 40 and to deposit the fluid resinous material 50 onto the reinforcing structure 40 in a pre-determined pattern. The molding pockets 22 may comprise a substantially continuous pattern in the molding surface 21, as best shown in FIG. 7B; in this instance, the resinous material 50 is transferred onto the reinforcing structure 40 in a substantially continuous pattern. As used herein, a pattern is said to be "substantially" continuous to indicate that minor deviations from absolute continuity may be tolerated, as long as these deviations do not adversely affect the process of the present invention and the performance and desired qualities of the final product— the papermaking belt 90. FIGS. 2A and 9A show two different exemplary embodiments of the papermaking belt 90 having a substantially continuous resinous framework 50a, made by using the continuous pattern of the molding pockets 22.

Figure 10:
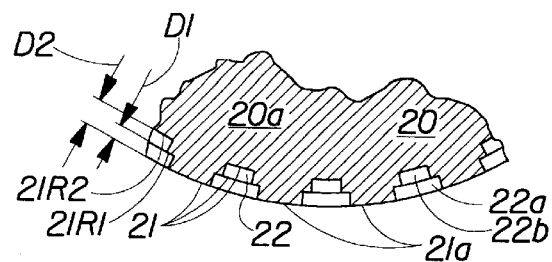
FIG. 10 is a schematic partial cross-sectional view of one exemplary embodiment of the molding roll of the present invention, comprising a plurality of molding pockets having differential depths.

Alternatively, the molding pockets 22 may comprise a pattern of discrete depressions, or cavities. In the latter instance, the resinous material 50 is transferred from the molding pockets 22 to the reinforcing structure 40 in a pattern comprising a plurality of discrete protuberances. An exemplary papermaking belt 90 5 having the resinous framework 50a comprising a plurality of discrete protuberances outwardly extending from the first side 41 of the reinforcing structure 40, is schematically shown in FIGS. 10, 11, and 11A. A pattern (not shown) comprising a combination of the substantially continuous molding pockets 22 and the discrete molding pockets 22 is also contemplated by the present invention.

The framework 50a which is "angled" relative to the first surface 41 of the reinforcing structure 40 is contemplated in the present invention. As used herein the term "angled" framework 50a refers to a framework 50a in which—if viewed in a cross-section—acute angles are formed between the first surface 41 of the reinforcing structure 40 and longitudinal axes of either discrete deflection conduits—in the instance of the continuous framework 50a, or discrete protuberances—in the instance of the framework 50a comprising a plurality of discrete protuberances.

These embodiments are disclosed in commonly assigned patent applications Ser. No. 08/858,661, and Ser. No. 08/858,662, both applications entitled "Cellulosic Web, Method and Apparatus For Making the Same Using Papermaking Belt Having Angled Cross-sectional Structure, and Method Of Making the Belt," and filed in the name of Larry L. Huston on May 19, 1997, the disclosures of which applications are incorporated herein by reference.

Figure 10A:
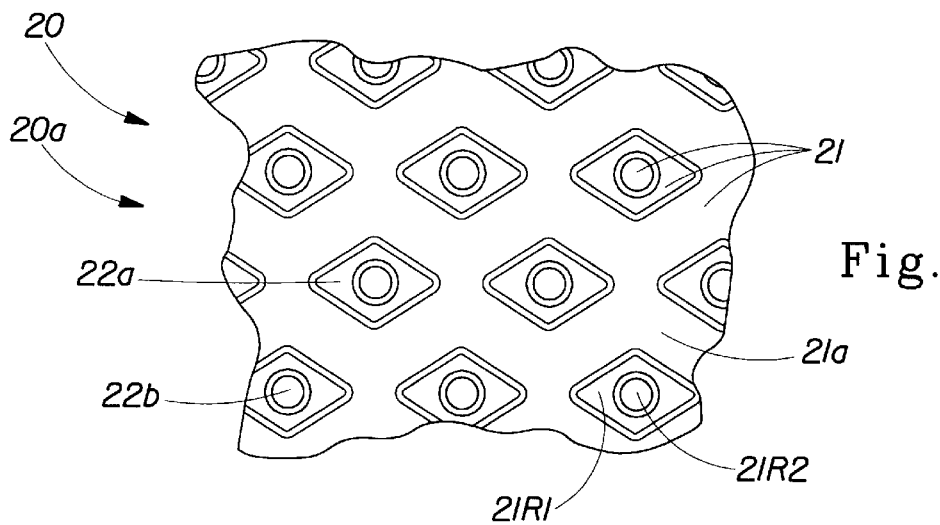
FIG. 10A is a schematic planar representation of a plan view taken along lines 10A—10A of FIG. 10.

The molding pockets 22 have at least one depth designated herein by a symbol "D." The depth D generally defines a thickness of the resinous material 50 deposited from the molding pockets 22 onto the reinforcing structure 40. As used herein, the term "depth" of the molding pocket(s) 22 indicates an extent of the geometrically-distinct depression(s) into the molding member 20. As an example, FIGS. 10 and 10A show a fragment of the molding member 20, comprising a molding roll 20a, having a plurality of discrete molding pockets 22. An inherent portion 21a of the molding surface 21 is that portion of the roll's external circumference which is not affected by the molding pockets 22, typically a portion of the roll's circumference corresponding to the roll's greater diameter. In FIGS. 10 and 10A, the inherent portion 21a is a continuous portion of the external circumference encompassing the discrete molding pockets 22. FIGS. 10 and 10A also show that each molding pocket comprises two geometrically-distinct depressions, a first depression 22a (relatively larger) having a shape of a rhombus, and a second depression 22b (relatively smaller) having a shape of a circle, as best shown in FIG. 10A. The first depression 22a has the first depth D1, and the second depression 22b has the second depth D2 greater than the first depth D1, and consequently the molding pockets 22 have two depths D1 and D2, as shown in FIG. 10. It should be understood that the foregoing examples are intended only for the illustrative purposes, and not for the purposes of limitation. Virtually an unlimited number of shapes and their permutations of the molding pockets 22 having differential depths may be used in the present invention. While FIGS. 10 and 10A show the geometrically-symmetrical molding pockets 22, it is to be understood that geometrically-asymmetrical configurations (in plan view as well as in a cross-section) may be used if desired (not shown). "Angled" configurations of the molding pockets 22 may be used to produce the "angled" pattern of the resinous framework 50a, as explained herein above. Furthermore, embodiments (not shown) may exist of the molding pockets 22 in which the relationship between a specific depth D and a geometrically-distinct configuration is not apparent, or even impossible to establish. The process of the present invention allows one advantageously to create almost any desired shape of the resinous framework 90 by providing the correspondingly-shaped molding surface 21.

The next step of the present invention comprises depositing the flowable resinous material 50 into the molding pockets 22 of the molding surface 21. Generally, in a preferred continuous process, this step comprises first, contacting the molding surface 21 with the flowable resinous material 50, and then removing excess of the resinous material 50 from the molding surface 21 as the molding surface 21 is moving. Preferably, the excess of the flowable resinous material 50 is removed into the source (trough) 55 of the resinous material 50, thereby reducing, or even eliminating, waste of the resinous material 50. Any suitable depositing means known in the art may be used in the apparatus 10 of the present invention to perform this step. As used herein, the term "depositing means" refers to anything capable of transferring the fluid resinous material 50 from a bulk quantity to the molding surface 21 in required dosage. The term "deposit" refers to a transfer of the fluid resinous material 50 from the bulk form (provided, for example, in the trough 55, described herein above) and dose the fluid resinous material 50 onto the molding surface 21 and/or into the molding pockets 22, such that the fluid resinous material 50 fills the molding pockets 22 in a substantially uniform manner. Removing of the excess of the resinous material 50 from the molding surface 21 may be accomplished by wiping and/or scraping the excess material from the molding surface 21.

Figure 4:
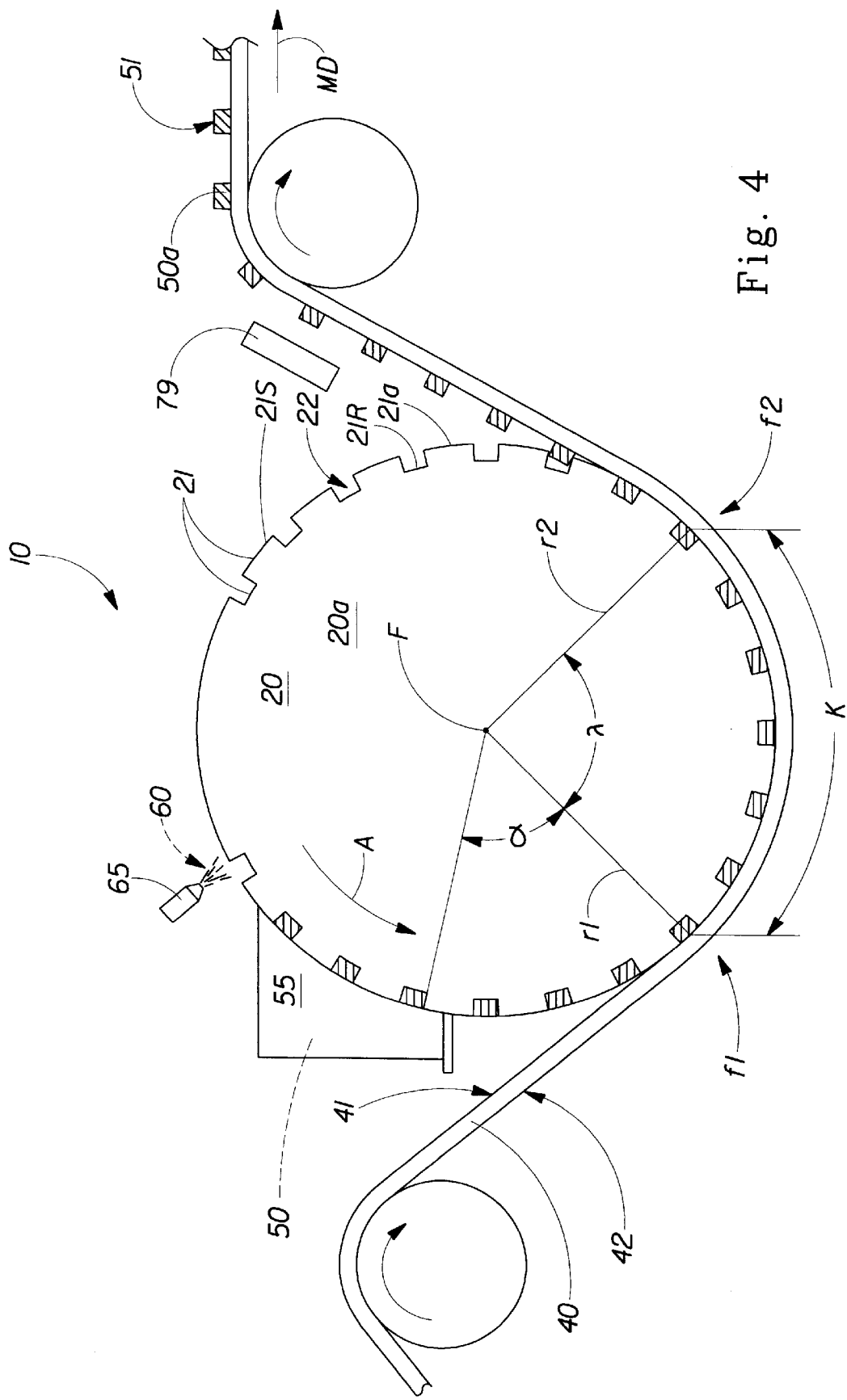
FIG. 4 is a schematic and partial side elevational view of one embodiment the process and the apparatus of the present invention, showing a molding roll and a belt being constructed.
Figure 12:
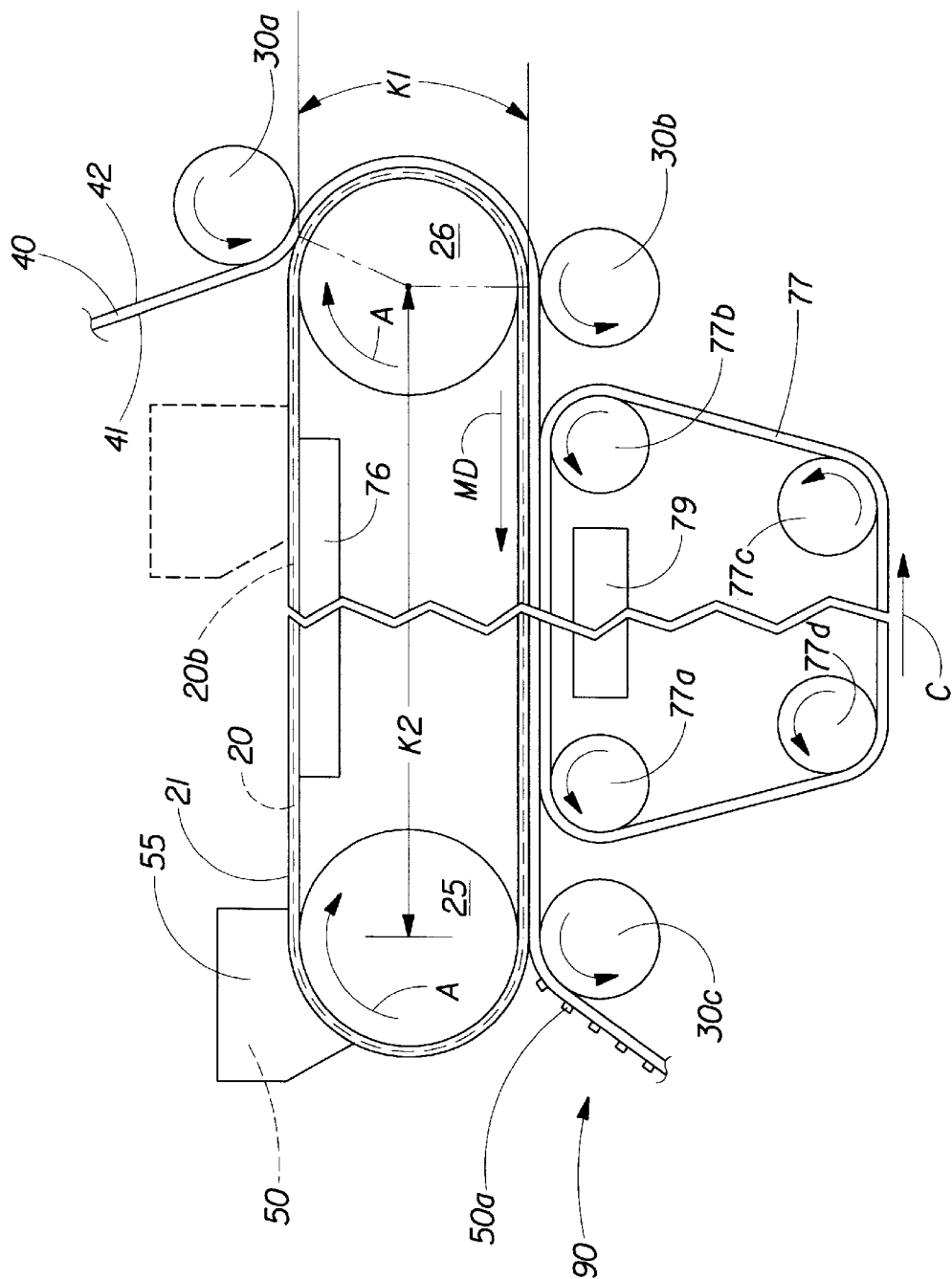
FIG. 12 is a schematic side elevational view of another embodiment of the process and the apparatus of the present invention, the apparatus comprising an endless molding band.

The next two steps comprise continuously transporting the reinforcing structure 40 at the transport velocity such that at least a portion of the reinforcing structure 40 is in a face-to-face relationship with at least a portion of the molding surface 20, and transferring the flowable resinous material 50 from the molding pockets 22 of the molding surface 20 onto the reinforcing structure 40 in the preselected pattern. Preferably, the portion of the reinforcing structure 40 facing the molding surface 20 contacts the molding surface 20 for a predetermined period of time. In the embodiments in which the molding member 20 comprises the molding roll 20a, the predetermined period of time during which the molding surface contacts the reinforcing structure 40 is defined by the transport velocity, a diameter of the molding roll 20a, and a wrap angle $\lambda$, shown in FIGS. 1, and 4–6. With reference to FIG. 4, as used herein, the term "wrap angle" defines an included angle $\lambda$ formed between two imaginary radii r1 and r2, the radius r1 connecting the longitudinal axis (or a center of rotation) F of the molding roll 20a and a point f1 at which the reinforcing structure 40 first contacts the molding surface 21, and the radius r2 connecting the longitudinal axis (or the center of rotation) F of the molding roll 20a and a point f2 at which the reinforcing structure 40 last contacts the molding surface 21. A part of the circumference between the point f1 and the point f2 defines a resulting contact zone K, i. e., an area of contact between the molding surface 21 and the reinforcing structure 40. In the embodiment of FIG. 12, in which the molding member 20 comprises the band 20a, the resulting contact zone K comprises a first (circumferential) contact zone K1 and a second (planar) contact zone K2. The resulting contact zone K preferably comprises a solidification segment of the process, i. e., a segment where the resinous material 50 solidifies such as to sufficiently join to the reinforcing structure 40 and retain its shape after disengagement from the molding surface 21. The resinous material 50 does not have to completely solidify in the solidification segment, and may retain some flowability after exiting the solidification segment, as long as the resinous material 50 is capable of sufficiently retaining its shape acquired while the resinous material 50 was associated with the molding pockets 22.

According to the present invention, the resinous material 50 is maintained in a sufficiently fluid state prior to its deposition onto the molding surface 21. Preferably, the resinous material 50 should be fluid enough to uniformly fill the molding pockets 22. In some embodiment, solidification of the resinous material 50 may begin right after the resinous material 50 has filled the molding pockets 22. In FIG. 4, an angle $\alpha$ schematically indicates a pre-solidification segment of the molding surface 21 after the resinous material 50 has been deposited onto the molding surface 21 and before the reinforcing structure 40 and the molding surface 21 meet in a face-to-face relationship (prior to reaching the point f1). One skilled in the art will appreciate that for a given resinous material 50, the desired level of viscosity of the resinous material 50 prior to reaching the point f1 is defined by several factors, including the design and transport velocity of the molding surface 21, relative geometry of the reinforcing structure 40 and the molding surface 21, the length of the resulting contact zone K, and other conditions of the process and parameters of the apparatus 10. Preferably, the viscosity of the resinous material 50 is greater at the pre-solidification segment of the molding surface 21, defined by the angle α, especially when the resinous material 50 reaches the point f1, relative to the viscosity of the resinous material in the trough 55.

According to the present invention, an embodiment is contemplated in which the resinous material 50 disposed in the molding pockets 22 solidifies such that the surface of the resinous material 50, which is in direct contact with the inside surface of the molding pockets 22 solidifies first, while the rest of the resinous material 50 disposed in the molding pockets 22 is still in the fluid state. Then, the surface of the resinous material 50, which is at least partially solidified, functions as a shell for the rest of the resinous material 50 which is still fluid. This embodiment may be particularly beneficial in the process using the reinforcing structure 40 having void spaces therethrough, such as, for example, a woven reinforcing structure 40. When the reinforcing structure 40 contacts the resinous material 50, pressure may be used to impress the reinforcing structure 40 and the resinous material relative each other, thereby "pushing" the resinous material 50 through the yarns of the reinforcing structure 40, which yarns form its first side 41, and into the reinforcing structure 40, without prohibitively distorting the shape of the resinous material 50 deposited onto the reinforcing structure 40.

Preferably, the time during which the molding surface 20 faces (and preferably contacts) the reinforcing structure 40 should be sufficient for the resinous material 50 to transfer from the molding pockets 22 onto the reinforcing structure 40. More preferably, this time should be sufficient for the resinous material 50 to join, at least partially, to the reinforcing structure 40 in a pre-selected pattern (corresponding to the pattern of the molding surface 21). For the successful transferal of the resinous material 50 from the molding pockets 22 onto the reinforcing structure 40, a variety of means, alone or in combination, may be used, according to the present invention.

Preferably, a surface energy of the molding pockets 22 is less than a surface energy of the reinforcing structure 40. Several ways exist of creating a surface energy differential between the molding pockets 22 and the reinforcing structure 40. A material comprising the molding surface 21 may inherently have a relatively low surface energy, or can be treated to lower its surface energy. Alternatively or additionally, the molding surface 21 can be treated with a release agent 60 prior to the step of depositing the resinous material 50 into the molding pockets 22. Examples of the release agent 60 include but are not limited to: "Ease Release™," "Permarelease™" "Actilease™," available from Smooth-On, Inc. Although a source 65 of the release agent 60 is schematically shown as a trough in several drawings, it is to be understood that the release agent 60 may be brushed, sprayed, or wiped onto the molding surfaces, in which instances the source 65 may comprise a brush, a nozzle, or any other suitable device known in the art. FIG. 4, for example, shows the source 65 comprising a nozzle. In some applications, it might be necessary to apply two or more coats of the release agent 60 to the molding surface 21. In some embodiments in which the molding surface has microscopic pores therein, it may be desirable to heat the release agent 60 or/and the molding surface 21 to facilitate penetration of the release agent 60 into the molding surface 21 thereby sealing the pores before depositing the resinous material 50 to the molding surface 21.

Figures 5, 6:
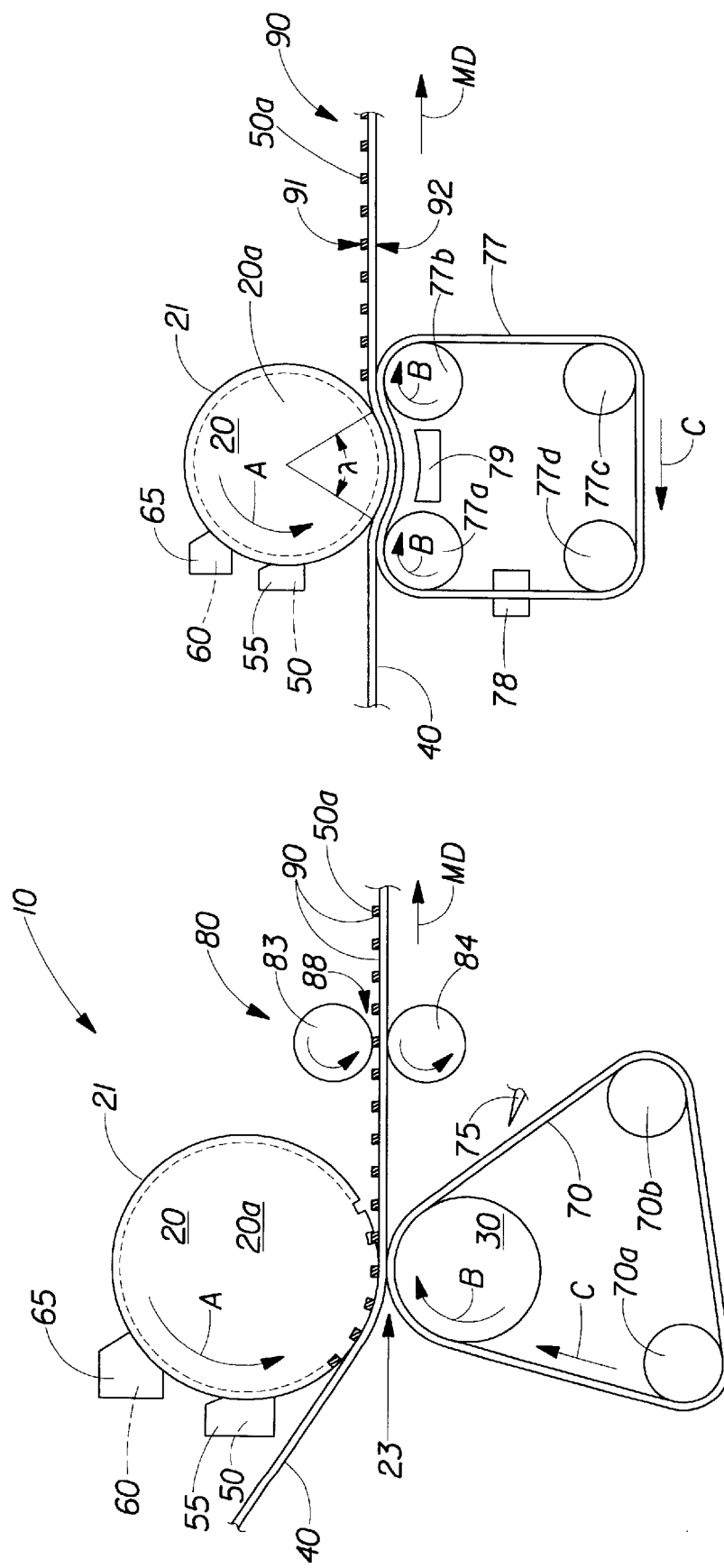
FIG. 5 is a schematic and partial side elevational view of another embodiment of the process and the apparatus of the present invention, the apparatus comprising a molding nip formed between the molding roll and a backing roll.
FIG. 6 is a schematic and partial side elevational view of still another embodiment of the process and the apparatus of the present invention, the apparatus comprising two backing rolls and a support sheet wrapping around the molding roll.

Other ways of causing the resinous material 50 to at least partially join the reinforcing structure 40 include applying pressure differential to press the reinforcing structure 40 relative to the molding surface 21 in the contact zone K, such as to cause a sufficient engagement between the resinous material 50 and the reinforcing structure 40. Typically, although not necessarily, the resinous material 50 does not "attach" to the reinforcing structure 40, but has to wrap around structural elements of the reinforcing structure 40 (such as, for example, individual yarns in a woven reinforcing structure 40), to "lock on" around them, thereby at least partially encasing some of them. Pressure facilitates penetration of the fluid or partially solidified resinous material 50 between the structural elements of the reinforcing structure 40. FIG. 5, for example, shows a backing roll 30 juxtaposed with the molding roll 20a to form a nip 23 therebetween. The reinforcing structure 40 is traveling through the nip 23 and is preferably pressed by the backing roll 30 against the molding surface 21 of the molding roll 20a. Preferably, the backing roll 30 rotates at a surface velocity substantially equal to the transport velocity of the reinforcing structure 40 at the nip 23. This embodiment may be beneficially used with the molding roll 20a having the molding surface 21 comprising a deformable, and preferably constant volume, material, as described in commonly-assigned and incorporated by reference herein U.S. Pat. No. 5,275,700. The deformable, preferably constant volume, molding surface 21 provides an effective contact between the reinforcing structure 40 and the resinous material 50 because the reinforcing structure 40 can be "impressed" under pressure into the molding surface 21, thereby facilitating joining of the resinous material 50 and the reinforcing structure 40.

Alternatively, a circumference of the backing roll 30 may comprise a layer (not shown) of a deformable, constant volume, material. A barrier film 70 may be provided, as shown in FIG. 5, to protect the surface of the backing roll 30 from being contaminated with the resinous material 50. The barrier film 70 may also comprise a deformable, preferably constant volume, material. Alternatively, the barrier film 70 is a flexible, smooth, and planar material easily conforming to the transporting configuration formed by the backing roll 30 and the support rolls 70a and 70b, about which the barrier film 70 is traveling in the direction indicated by an arrow "C." The barrier film is described in sufficient detail in commonly-assigned and incorporated by reference herein U.S. Pat. No. 5,275,700.

In FIGS. 6 and 12, the reinforcing structure 40 pressed against the molding surface 21 by a backing sheet 77 under tension. In the embodiment of FIG. 6, the backing sheet 77 wraps around a portion of the molding roll 20a. In the embodiment of FIG. 12, the backing sheet 77 is substantially planar and travels within the second contact zone K2. In both embodiments (of FIGS. 6 and 12), the backing sheet 77 is supported by and travels around support rolls 77a, 77b, 77c, 77d in a direction indicated by an arrow "C." In these embodiments, one or more additional support roll(s) (not shown) may be provided between the rolls 77a and 77b for an additional support of the backing sheet 77 and/or additionally to press the reinforcing structure 40 against the molding surface 21.

FIGS. 7 and 8 show other exemplary embodiments comprising two (FIG. 7) and three (FIG. 8) backing rolls 30. In such embodiments comprising more than one backing rolls 30, the pressure applied to the reinforcing structure 40 may differentiate between the backing rolls. For example, in FIG. 7, a first backing roll 30a applies a first pressure P1 at a first nip 23*a*, and a second backing roll 30*b* applies a second pressure P2 at a second nip 23*b* to the reinforcing structure 40. If desired, the pressure P2 may be greater than the pressure P1, or vice versa. Analogously, in FIG. 8, backing rolls 30*a*, 30*b*, and 30*c* may apply differential pressure to the reinforcing structure 40 at corresponding nips 23*a*, 23*b*, 23*c*, respectively.

Figure 8B:
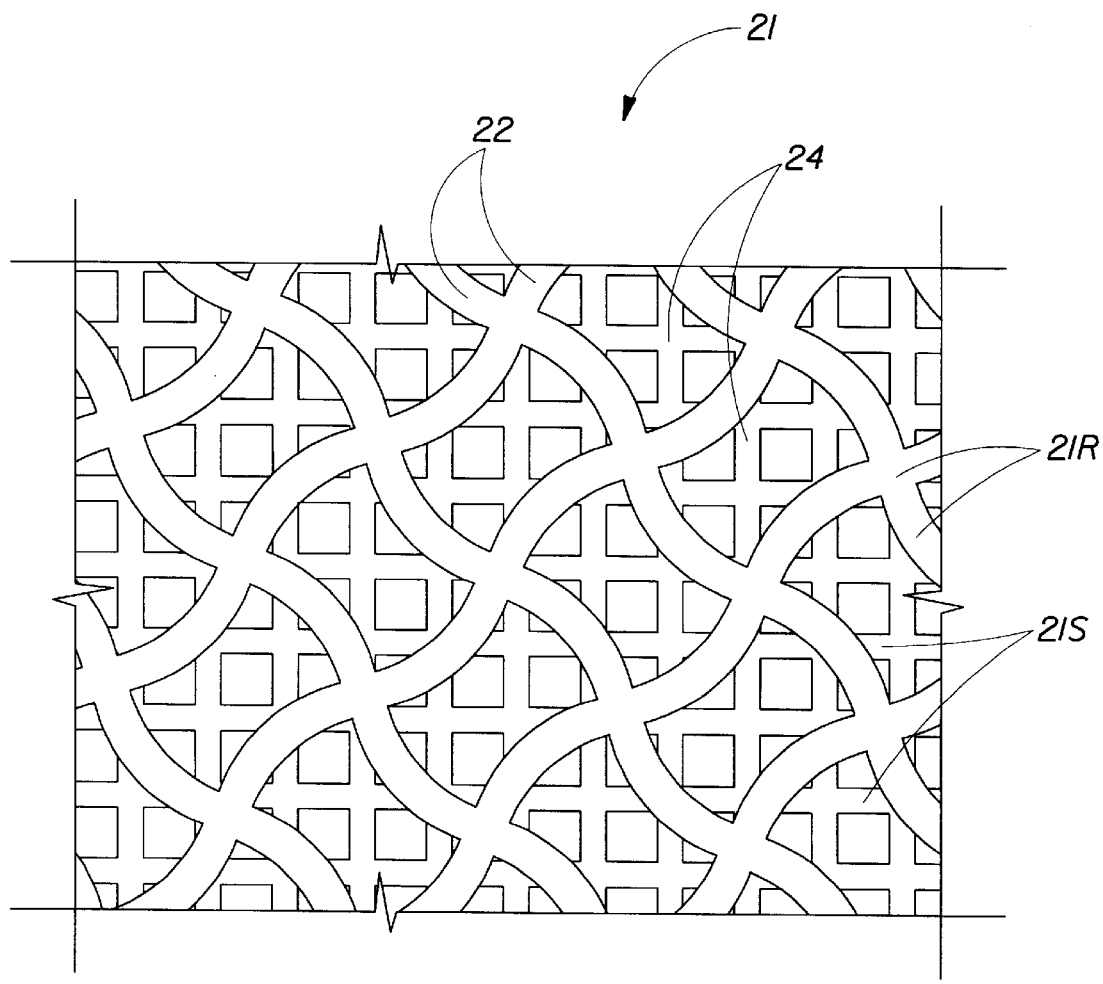
FIG. 8B is a fragmental and schematic planar representation of a view taken along the lines 8B—8B of FIG. 8A, showing one exemplary embodiment of the circumference of the molding roll, comprising a pattern of molding pockets for receiving a flowable resin, and a pattern of recesses for receiving the reinforcing structure, two patterns being mutually interposed, the molding pockets having a depth greater than that of the recesses for the reinforcing structure.

FIGS. 7–8B show two exemplary embodiments of the apparatus 10, in which the reinforcing structure 40 is recessed in the molding surface 21. The molding surfaces 21 shown in FIGS. 7–8B has pre-determined patterns of recesses 24 for receiving the reinforcing structure 40 therein. In the embodiment of FIGS. 7–7B, the reinforcing structure 40 is completely recessed within the recesses 24 of the molding surface 21, the recesses 24 having a depth not less than, and preferably equal to, the thickness h of the reinforcing structure 40. In the embodiment of FIGS. 8–8B, the reinforcing structure 40 is only partially recessed within the recesses 24, the depth of the recesses 24 for receiving the reinforcing structure being less than the thickness h of the reinforcing structure 40. The pattern of the molding pockets 22 for receiving the flowable resinous material 50 is superimposed with the pattern of recesses 24 for receiving the reinforcing structure 40. In FIGS. 7–8B, a portion of the molding surface 21, which portion provides support for the reinforcing structure 40 is designated as 21R; and a portion of the molding surface 21 provides support for the resinous material 50 is designated as 21S. Preferably, a step of registering the reinforcing structure 40 with the recesses 24 is performed in the embodiments principally illustrated in FIGS. 7–8A.

The embodiment of the process shown in FIGS. 7–7B provides a novel and effective way of constructing a papermaking belt 90 having a "zero-overburden." As used herein, the term "overburden" refers the extent of elevation of the resinous framework 50 relative to the reinforcing structure 40. More particularly, the overburden comprises a distance formed between the top side 51 of the resinous framework 50 and the first side 41 of the reinforcing structure 40, as best shown in FIG. 9, where the overburden is designated as "OB," the thickness of the reinforcing structure 40 is designated as "h," and a caliper of the papermaking belt 90 is designated as "H." When the resinous framework 50*a* extends outwardly from the reinforcing structure 40, it is said that the belt has the overburden. The term "zerooverburden" indicates that the web-contacting side 41 of the resinous framework 50 and the first side 42 of the reinforcing structure 40 are situated in the same plane. Because in the embodiment of FIGS. 7–7B the recesses 24 has the same depth as the molding pockets 22 do, the surface portions 21S and 21R are evenly situated relative to the greater external circumference 21*a* (or relative to the longitudinal axis of rotation) of the molding roll 20. Therefore, when the reinforcing structure 40 is registered with the recesses 24, and the resinous material 50 is deposited into the molding pockets 22, the resinous material 50 cannot extend beyond the surface portion 21R, and thus cannot extend beyond the first side 41 of the reinforcing structure 40 in the belt 90 being made, as shown in FIG. 7A.

FIGS. 8–8B illustrate another advantage provided by the present invention. Because in the embodiment of FIGS. 8–8B the reinforcing structure 40 is partially recessed within the recesses 24, there is a distance "Z" formed between the second side 42 of the reinforcing structure 40 and the backside of the resinous framework 50 when the belt 90 is formed. In a through-air-drying papermaking belt, the distance "Z" creates a leakage between the belt's backside surface 92 contacting the papermaking equipment (such as, for example, a vacuum box or a pick-up shoe) and the belt-contacting surface of such equipment. The leakage mitigates a sudden application of vacuum pressure to the paper web disposed on the belt 90, and thus reduces, if not completely eliminates, so-called pinholing. One skilled in the art will recognize that the term "pinholing" refers to formation of pin-sized holes, or "pinholes," in the web being dewatered, as a result of the sudden application of the vacuum pressure to the web and consequent separation of a certain amount of fibers from the web. Some of the fibers may completely pass through the papermaking belt, thereby causing, in addition to pinholing, clogging of the vacuum dewatering machinery with the papermaking fibers. Several commonly-assigned and incorporated herein by reference U.S. patents disclose various ways of mitigating or eliminating pinholing: U.S. Pat. No. 5,776,311 issued Jul. 7, 1998 in the name of Trokhan et al., U.S. Pat. No. 5,744,007 issued Apr. 28, 1998 in the name of Trokhan et al., U.S. Pat. No. 5,741,402 issued Apr. 21, 1998 in the name of Trokhan et al., U.S. Pat. No. 5,718,806 issued Feb. 17, 1998 in the name of Trokhan et al., and U.S. Pat. No. 5,679,222 issued Oct. 21, 1997 in the name of Rasch et al. are examples of such patents. The present invention provides another effective means for mitigating the undesirable pinholing.

One skilled in the art will appreciate that the pattern of the resinous material 50 transferred from the molding surface 21 onto the reinforcing structure 40 reflects the pattern of the molding surface 21. Thus, if the molding surface 21 comprises a substantially continuous pattern of the molding pockets 22, as shown in FIGS. 7B and 8B, the resinous material 50 is transferred onto the reinforcing structure 40 in a substantially continuous pattern. If, on the other hand, the molding surface 21 comprises a plurality of discrete molding pockets 22, as best shown in FIG. 10A, the resinous material 50 is transferred onto the reinforcing structure 40 in a pattern comprising a plurality of resinous protuberances, FIG. 11A.

The next step of the process of the present invention comprises solidifying the resinous material 50 joined to the reinforcing structure 40. As used herein, the term "solidification" and derivations thereof refer to a process of altering a fluid to a solid, or partially solid, state. Typically, solidification involves a phase change, from a liquid phase to a solid phase. The term "curing" refers to a solidification in which cross-linking occurs. For example, photosensitive resins may be cured by UV radiation, as described in commonly assigned U.S. Pat. Nos. 5,334,289; 5,275,700; 5,364,504; 5,098,522; 5,674,663; and 5,629,052, all of which are incorporated herein by reference. The thermoplastic and thermo-setting resins require a certain temperature for solidification. Preferably, the step of solidification comprises curing of the resinous material 50.

In some embodiments the process of solidification of the resinous material 50 may begin as early as immediately after the fluid resinous material 50 has been deposited onto the molding surface 21. Preferably, solidification continues while the reinforcing structure 40 and the molding surface 21 are in face-to-face relationship (schematically shown as the resulting contact area K in the exemplary embodiment of FIG. 4 and as the contact areas K1 and K2 in the exemplary embodiment of FIG. 12). A method of solidifying the resinous material 50 depends upon its nature. If a thermoplastic or thermosetting resin is used, solidifying comprises cooling the resinous material 50 transferred onto the reinforcing structure 40. Photopolymer resins may be cured by a process of curing described in commonly assigned U.S. Pat. Nos. 4,514,345; and 5,275,700, incorporated herein by reference and referred to above. The resinous material 50 comprising multi-component resins or plastics may solidify naturally, during a certain predetermined period of time, by virtue of being mixed together.

As an example, FIGS. 6 and 12 schematically show a curing device 79 juxtaposed with the second side 42 of the reinforcing structure 40. One skilled in the art will understand that, depending on the nature of the resinous material 50 and the method of its solidifying, the curing device 79 may be located in other locations, for example, be juxtaposed with the resinous framework 50a, as schematically shown in FIG. 4. The examples of the curing device 79 include, but are not limited to: a heater for increasing cross-linking reaction rates or condensing rates for condensing polymers; a cooler for solidifying thermoplastics; various apparatuses providing an infra-red curing radiation, a microwave curing radiation, or a ultra-violet curing radiation; and the like. Commonly assigned patent application, Ser. No. 08/799,852, entitled "Apparatus for Generating Parallel Radiation For Curing Photosensitive Resin" filed in the name of Trokhan on Feb. 13, 1997; and commonly assigned patent application, Ser. No. 08/858,334, entitled "Apparatus for Generating Controlled Radiation For Curing Photosensitive Resin" filed in the names of Trokhan et al. on Feb. 13, 1997, and its continuation Ser. No. 08/958,540 filed on Oct. 24, 1997 are incorporated herein by reference for the purpose of showing several embodiments of the curing device 79 which can be used for solidifying the resinous material 50 comprising a photosensitive resin.

Optionally, a step of controlling the caliper H (FIG. 9) of the belt 90 may be provided in the process of the present invention. The caliper H may be controlled to a pre-selected value by controlling the overburden OB, as has been explained herein above. Also, the caliper H may be controlled by controlling the depth of recesses 24 for the reinforcing structure 40 (FIG. 8A). Another way of controlling the caliper H comprises changing the thickness of the resinous material 50 after the resinous material 50 has been transferred from the molding surface 21 to the reinforcing structure 40, and after the resinous framework has been at least partially formed. For example, the thickness of the resinous material 50 can be adjusted by mechanical means known in the art. FIGS. 1 and 5 schematically show a caliper-controlling device 80 comprising two mutually-juxtaposed rolls forming a clearance 88 therebetween. By adjusting the clearance 88 between the rolls of the device 80, one can control the caliper of the belt being constructed. In the embodiments in which the resinous framework 50a is only partially solidified after having being formed between the molding surface 21 and the reinforcing structure, the caliper of the partially-formed belt may be slightly adjusted by causing the partially-formed belt to travel through the clearance 88. Alternatively or additionally, the caliper-controlling device may comprise a rotating sanding roll, a planing knife, a laser, or any other means known in the art and suitable for the purpose of controlling the caliper of the belt 90.

The process and the apparatus of the present invention significantly reduces the amount of the flowable resin that is required to be used in constructing he belt 90, and thus provides an economic benefit. The prior art's methods of making the belt, using a photosensitive resin and a curing radiation, requires application of a coating of the photosensitive resin to the reinforcing structure, curing selected portions of the resinous coating, and then removing (typically, washing out) uncured portions of the resinous coating. The amount of the resin being washed out is about from 25% to 75% relative to the amount of the entire resinous coating. In the present invention, the exact amount of the resinous material 50, which is required for the resinous framework 50a is formed into a pre-determined pattern of the molding pockets 22 of the molding member 20. The excess of the resinous material 50 deposited onto the external (inherent) surface 21a of the molding member 20 may be (and preferably are) easily recycled, by any means known in the art, into the source 55 of the resinous material 50, thereby completely eliminating waste of the resinous material 50. Furthermore, the process and the apparatus of the present invention allows one to create virtually unlimited number of three-dimensional patterns of the resinous framework 50a.

The process of the present invention may have two or more steps. FIG. 1 schematically shows a two-step process. At a first step, a resinous material 50 is deposited on a first molding surface 21 of a first molding member 20a, and then transferred to the reinforcing structure 40 to form a first resinous framework 50a (best shown in FIGS. 2 and 2A). Optionally, the caliper of the belt being made can be adjusted by the caliper-controlling device 80. At the second step, a resinous material 50' is deposited on a second molding surface 21' of a second molding member 20a', and then transferred onto the web-contacting surface 51 of the resinous framework 50a to form a second resinous framework 50a' (best shown in FIGS. 3 and 3A). The steps may be repeated as desired.

What is claimed is:

1. A process for making a papermaking belt comprising a reinforcing structure and a resinous framework joined thereto, the process comprising the steps of:
    (a) providing a reinforcing structure having a first side, a second side opposite to the first side, and a thickness formed therebetween;
    (b) providing a flowable resinous material;
    (c) providing at least one molding member comprising an endless molding band having a molding surface comprising a pre-selected pattern of molding pockets to carry the flowable resinous material therein;
    (d) continuously moving the molding surface at a transport velocity;
    (e) depositing the flowable resinous material into the molding pockets of the molding surface;
    (f) continuously transporting the reinforcing structure at the transport velocity such that at least a portion of the reinforcing structure is in a face-to-face relationship with at least a portion of the molding surface;
    (g) transferring the flowable resinous material from the molding pockets of the molding surface onto the reinforcing structure;
    (h) causing the flowable resinous material and the reinforcing structure to join together; and
    (i) solidifying the resinous material thereby forming the resinous framework joined to the reinforcing structure, whereby the papermaking belt is formed.

2. The process according to claim 1, wherein in the step (g) the flowable resinous material is transferred from the molding pockets of the molding surface onto the reinforcing structure in the pre-selected pattern.

3. The process according to claim 1, wherein the step (e) comprises:
    contacting the molding surface with the flowable resinous material; and
    removing excess of the flowable resinous material from the molding surface as the molding surface is moving.

4. The process according to claim 1, wherein in the step (f) the reinforcing structure contacts the flowable resinous material disposed in the molding pockets for a predetermined period of time sufficient to cause the flowable resinous material and the reinforcing surface at least partially join together.

5. The process according to claim 1, further comprising the steps of:
provic at least one backing roll juxtaposed with the molding surface to form therebetween a nip for receiving the reinforcing structure traveling therethrough, and
rotating the backing roll at a surface velocity substantially equal to the transport surface velocity of the reinforcing structure at the nip.

6. The process according to claim 1, further comprising a step of controlling a thickness of the resinous material joined to the reinforcing structure to at least one pre-selected value.

7. The process according to claim 1, wherein in the step (g) the resinous material is transferred onto the reinforcing structure in a substantially continuous pattern.

8. The process according to claim 1, wherein in the step (g) the resinous material is transferred to the reinforcing structure in a pattern comprising a plurality of discrete protuberances.

9. The process according to claim 1, wherein in the step (h) the resinous material extends outwardly from the first side of the reinforcing structure after the resinous material has been joined to the reinforcing structure.

10. The process according to claim 9, wherein the resinous material has differential thickness.

11. The process according to claim 1, wherein in the step (a) the reinforcing structure comprises a fluid-permeable element.

12. The process according to claim 11, wherein the reinforcing structure comprises a woven fabric or a screen having a plurality of open areas therethrough.

13. The process according to claim 1, wherein in the step (a) the reinforcing structure comprises a fluid-impermeable element.

14. The process according to claim 1, wherein in the step (a) the reinforcing structure comprises a felt.

15. The process according to claim 1, wherein in the step (b) the flowable resinous material comprises a material selected from the group consisting of epoxies, silicones, urethanes, polystyrenes, polyolefins, polysulfides, nylons, butadienes, photopolymers, and any combination thereof.

16. The process according to claim 1, further comprising a step of treating the molding pockets with a release agent prior to the step (e).

17. The process according to claim 1, further comprising a step of pressing the reinforcing structure and the molding member relative to each other for a predetermined period of time.

18. The process according to claim 1, further comprising a step of controlling a thickness of the papermaking belt being constructed.

19. The process according to claim 1, wherein the step of providing at least one molding member comprises providing the molding member having the molding surface comprising a predetermined pattern of recesses for receiving the reinforcing structure therein.

20. The process according to claim 1, further comprising a step of treating the molding surface of the molding member with a release agent.

21. The process according to claim 1, wherein the step of providing at least one molding member comprises providing the molding member comprising a molding roll.

22. The process according to claim 1, wherein in the step (a) the reinforcing structure comprises a woven fabric or a screen having a plurality of open areas therethrough and a felt joined to said woven fabric or screen.

23. A process for making a papermaking belt comprising a reinforcing structure and a resinous framework joined thereto, the process comprising the steps of:
(a) providing a reinforcing structure having a first side, a second side opposite to the first side, and a thickness formed therebetween;
(b) providing a flowable resinous material;
(c) providing a molding member comprising an endless molding band having a molding surface comprising a pre-selected pattern of molding pockets structured and configured to carry the flowable resinous material therein;
(d) continuously moving the molding surface at a transport velocity;
(e) depositing the flowable resinous material into the molding pockets of the molding surface;
(f) continuously transporting the reinforcing structure at the transport velocity such that at least a portion of the reinforcing structure is in a face-to-face relationship with at least a portion of the molding surface;
(g) pressing the reinforcing structure and the molding member relative to each other for a predetermined period of time and transferring the flowable resinous material from the molding pockets of the molding surface onto the reinforcing structure;
(h) causing the flowable resinous material and the reinforcing structure to join together;
(i) controlling a thickness of the resinous material; and
(j) solidifying the resinous to form the resinous framework joined to the reinforcing structure, whereby the papermaking belt is formed.

24. A process for making a papermaking belt, the process comprising the steps of:
(a) providing a reinforcing structure;
(b) providing a flowable resinous material;
(c) providing a molding member comprising a molding band having a pre-selected pattern of molding pockets structured and configured to carry the flowable resinous material therein;
(d) depositing the flowable resinous material into the molding pockets of the molding member;
(e) bringing together the reinforcing structure and the molding member such that at least a portion of the reinforcing structure is in a face-to-face relationship with at least a portion of the molding member having the molding pockets therein;
(f) transferring the flowable resinous material from the molding pockets of the molding member onto the reinforcing structure;
(g) causing the flowable resinous material and the reinforcing structure to join together; and
(h) solidifying the resinous material thereby forming the resinous framework joined to the reinforcing structure.

25. The process according to claims 1, 23, or 24, wherein the step of providing a molding member comprises providing the molding member having a substantially continuous pattern of molding pockets, a pattern of molding pockets comprising discrete depressions, or any combination thereof.

* * * * *